United States Patent [19]

Godrick et al.

[11] 4,072,262

[45] Feb. 7, 1978

[54] METHOD OF FABRICATING A SOLAR HEATING UNIT

[75] Inventors: Joseph A. Godrick, Wellesley; Joseph Leo Sliney, Lexington, both of Mass.

[73] Assignee: Kennecott Copper Corporation, New York, N.Y.

[21] Appl. No.: 784,239

[22] Filed: Apr. 4, 1977

[51] Int. Cl.² .................... B21D 39/00; B23K 31/02; F24J 3/02
[52] U.S. Cl. .................................. 228/265; 228/183
[58] Field of Search .............. 228/265, 141.1, 166, 228/173, 174, 183; 165/171; 126/271

[56] References Cited

U.S. PATENT DOCUMENTS

| | | | |
|---|---|---|---|
| 3,384,167 | 5/1968 | Jarkin | 165/171 |
| 3,698,475 | 10/1972 | Beck | 165/171 |
| 3,952,725 | 4/1976 | Edmondson | 126/271 |
| 3,972,317 | 8/1976 | Gallagher | 126/271 |
| 3,974,822 | 8/1976 | Patil | 126/271 |
| 3,980,071 | 9/1976 | Barber | 126/271 |
| 3,987,784 | 10/1976 | Godrick | 126/271 |

*Primary Examiner*—Donald G. Kelly
*Attorney, Agent, or Firm*—John L. Sniado; Anthony M. Lorusso

[57] ABSTRACT

A method of fabricating a solar heating unit having tubular conduits for containing high pressure fluids is disclosed. The method comprises the steps of forming a thin sheet of soft metal, preferably a fully annealed copper sheet, by applying sufficient temperature and pressure to creep or thermally form the sheet in a grooved plate using an assembly of the fluid conduits having a paste solder applied thereon. The solder is melted during the creep forming step to form a good metallurgical bond between the sheet and the conduits.

8 Claims, 6 Drawing Figures

METHOD OF FABRICATING A SOLAR HEATING UNIT

The invention relates generally to a method of constructing a solar heating unit, and in particular to a method for constructing a solar heating unit which has a solar energy absorber plate with fluid flow paths connected thereto for heating fluids.

BACKGROUND OF THE INVENTION

Methods for using solar energy to heat fluids are well known in the art. In particular, methods employing a solar energy absorber panel in thermal contact with fluid conduits are well known. For example, Godrick, U.S. Pat. No. 3,987,784, owned by the assignee of this application, describes and claims a solar energy absorber panel utilizing a thin, energy absorbing sheet in thermal contact with a plurality of fluid conduits. The conduits are arranged in a parallel array extending the length of the panel, and are shaped to provide a large area of thermal contact between the conduits and the absorber panel. In Godrick, each fluid conduit has a flat side which is bonded to the surface of the thin solar energy absorber panel.

When a solar energy absorber panel, such as that described by Godrick, is used to provide hot water from a relatively high pressure source, such as city line pressure (50 to 125 psig), the substantially rectangular cross-sectional conduits described in Godrick should probably not be used. In their place, a conduit having a circular cross section should be used to better withstand the higher pressures.

Indeed, conduits having circular cross sections have been used by others to provide a solar heating system for hot water. The conduits are generally connected to the energy absorbing panel by a thermally conductive cement, paint, or solder to provide as much thermal contact as possible. However, many of the fabrication methods employed by these prior art systems are expensive, because they require elaborate tooling to form the panels. Other methods require heavier weight panels than those described in Godrick, thereby increasing the cost and weight per unit, and still others are uneconomical because the number of steps in the fabrication process increases the cost per unit. Some prior art methods are described in Godrick as well as: Edmondson, U.S. Pat. Nos. 3,952,725; Patil, 3,974,822; Jarkin, 3,384,167; Beck, 3,698,475; Gallagher, 3,972,317; and Barber, Jr., 3,980,071.

Therefore, principle objects of this invention are a method for making a solar heating unit utilizing circular cross section conduits which is simple to implement, which requires few process steps, which is substantially self-aligning, which is reliable, and which provides a significant area of contact between the conduits and the absorber panel. Other objects of the invention include a method which results in a low cost, low weight unit, which does not require complicated or expensive tools and dies, and which can be easily implemented on a mass production basis.

Another object of the invention is to provide a method which results in a solar absorber panel which requires a minimum of material components.

SUMMARY OF THE INVENTION

The invention features a method of fabricating a solar heating unit for heating fluids having the following steps. A thin soft annealed sheet having a good thermal conductivity characteristic is placed in an abutting relation to a grooved surface of a self-supporting, thermally conductive planar plate. The sheet is between one-eighth hard and fully annealed. The plate is preferably aluminum or cast iron. A plurality of cylindrical elongated tubular elements in a spaced apart planar relation are assembled, the spacing between the elements being equal to the spacing between the grooves in the plate and the contour of the grooves conforming to substantially an attachment portion of the contour of the elements. Headers are connected in a fluid-tight connection to the assembled elements to provide fluid flow paths between the headers and through the elements. A thermally conductive paste adhesive is then applied along the attachment portion of the elements and the assembled tubular elements are positioned in an aligned relationship to the grooves in the plate and with the attachment portion abutting the thin sheet. The elements are then pressed against the sheet with sufficient pressure and temperature to creep form the sheet to conform it to the contours of the grooves and simultaneously to melt the paste adhesive to thereby provide a good thermally conductive metallurgical bond between the elements and the sheet.

In the preferred embodiment of the invention, the sheet is first heated to substantially the temperature at which the paste adhesive begins to melt and thereafter, while maintaining about the same temperature, sufficient pressure is applied between the elements and the grooved paste to effect creep forming.

DESCRIPTION OF THE DRAWINGS

Other objects, features and advantages of the invention will appear from the following description of a preferred embodiment taken together with the drawings in which.

DESCRIPTION OF A PREFERRED EMBODIMENT

Figure 1:
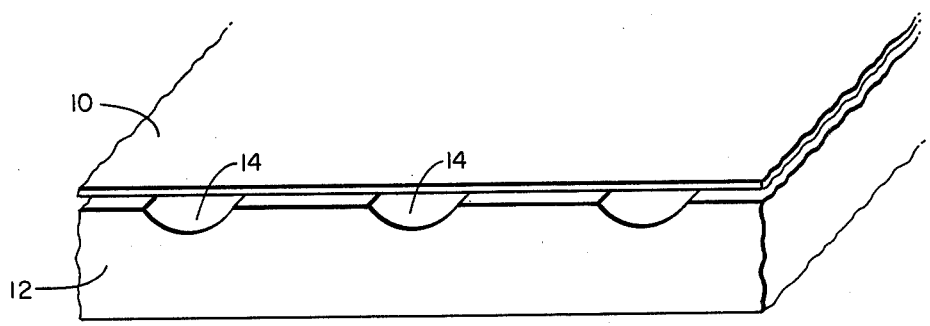
FIG. 1 shows an exaggerated perspective view of the thin sheet in its abutting relationship to the grooved plate.

Referring to FIG. 1, according to the preferred method of the invention, a thin sheet 10 of thermally conductive material is placed in an abutting relationship to a relatively thick, self-sustaining, thermally conductive plate 12. Sheet 10 is preferably a thin sheet of fully annealed copper, however a thin copper sheet between one-eighth hard and fully annealed (whose fabrication is well known in the art), provides a satisfactorily soft copper sheet. (Typical annealing times and temperatures can be found in the Standards Handbook, Wrought Mill Products Alloy Data/2 published by the Copper Development Association, Inc. (1973).) Alternatively the sheet may be softened by working it lightly. Preferably, the sheet is about 0.0027 inches thick; however, any thickness in general conformity with the principles described in Godrick, U.S. Pat. No. 3,987,784, and incorporated herein by reference, would be suitable. The base plate 12 is preferably a relatively thick flat plate, preferably of either aluminum or cast iron, which has therein, parallel aligned grooves 14, which will conform to the outside contour of an assembly of conduit elements, described hereinafter, which will be placed thereon.

Figure 2:
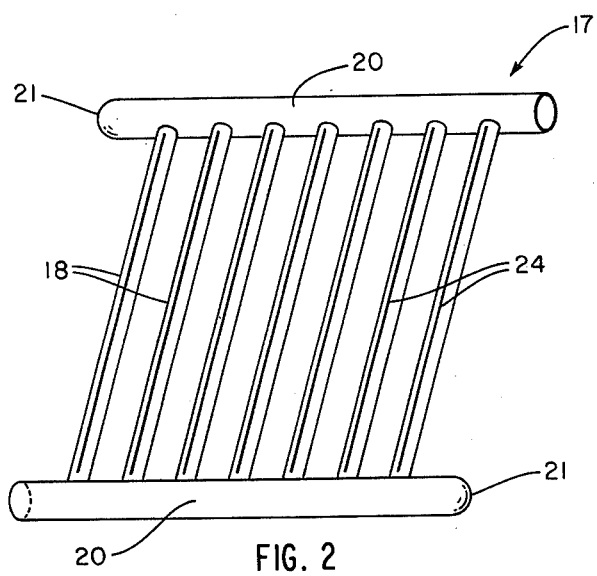
FIG. 2 is a perspective view of the assembled conduit elements and headers.

According to the preferred embodiment of the method, an assembly 17 of cylindrical conduit elements 18 is fabricated with the spacing between elements equal to the spacing between the grooves 14 of plate 12. The conduits 18 are preferably hard drawn copper tubes having a circular cross section. Referring to FIG. 2, the tubular conduits 18 are assembled in manifold or header sections 20. The headers are predrilled and the conduits 18 are inserted therein. Prior to the insertion step, a stop means (not shown) comprising for example an elongated conduit having an outside diameter less than the inside diameter of the headers is inserted into each manifold or header 20 to prevent tubes 18 from contacting the opposite inside wall of the header during the insertion step. Headers 20 are each closed at one end 21.

Conduits 18 are then bonded to the headers 20. The bonding material is preferably a paste brazing alloy such as B Cu P2 (American Welding Society Designation) or brazing preforms which would be placed on the tubes to header joints. The assembly, with the paste brazing, is placed in a gas manifold to melt and flow the braze into the joint. Brazing is preferred over the alternative of, for example, a lead-tin solder for both strength and compatability with the selective surfaces of the solar panel. Solder can poison most selective surfaces and inhibit good coatings. The B Cu P2 braze joint on the other hand will be coated by most selective surfaces.

Figure 3:
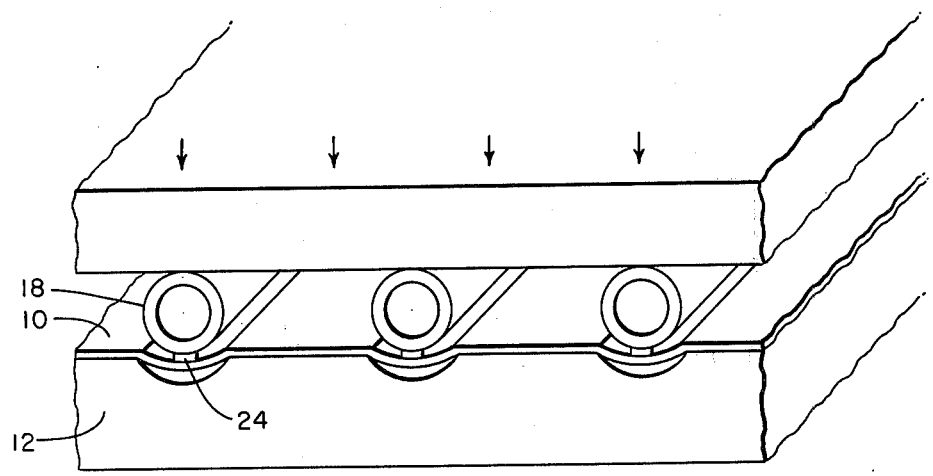
FIG. 3 is an exaggerated perspective view showing the beginning of the creep forming step according to the invention.
Figure 4:
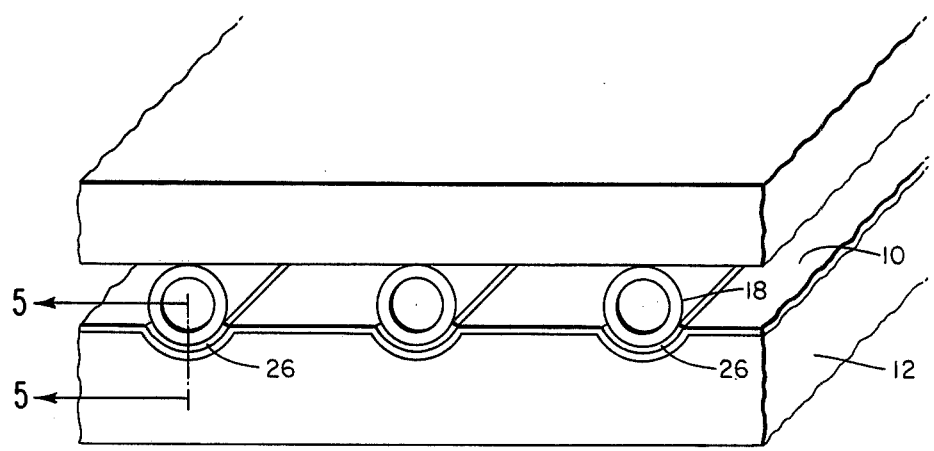
FIG. 4 is an exaggerated perspective view after the creep forming step according to the invention.
Figure 5:
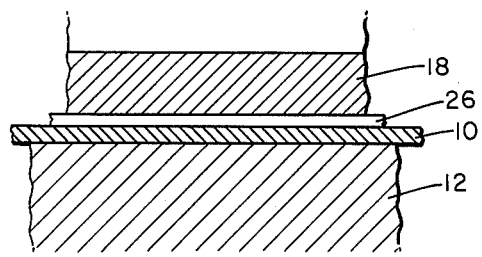
FIG. 5 is an enlarged cross section view taken along lines 5—5 of FIG. 4.

Preferably in this embodiment, a line 24 of a conductive paste adhesive, preferably a high temperature paste solder of the 5 SN-95 Pb or 10 SN-90 Pb type, is then applied to or dispensed along the center line of each conduit 18 prior to placing the assembly on the sheet. It is the surface area of the conduit 18 to which the solder is applied which will be attached to and make thermal contact with the absorber panel, thin sheet 10. The solder containing portion of the assembly 17, the attachment portion, is then placed, face down, on the soft annealed copper sheet (FIG. 3). It is lightly clamped or pressed against the grooved plate. The plate 12 is heated, for example electrically or by gas flame, to a temperature of 600°-700° F, and then the clamping pressure is increased as the temperature reaches the 600°-700° F range to creep form the sheet into the grooved plate. As creep forming proceeds, the line of solder simultaneously melts or widens and wets the surfaces of the sheet and the conduit at 26 (FIG. 5). At the end of the forming step, the sheet 10 preferably covers and is in thermal contact with approximately 120° or one-third of the conduit surface. After the forming process is complete, a cooling coil (not shown) is provided to minimize the cooling cycle time.

The pressure applied during the forming process is sufficient to effect forming in preferably 2-4 minutes. The pressure is not so great, however, to tear thin sheet 10 or to collapse or deform elements 18. Typically the pressure may be in the range of about 5 to 30 psi.

Figure 6:
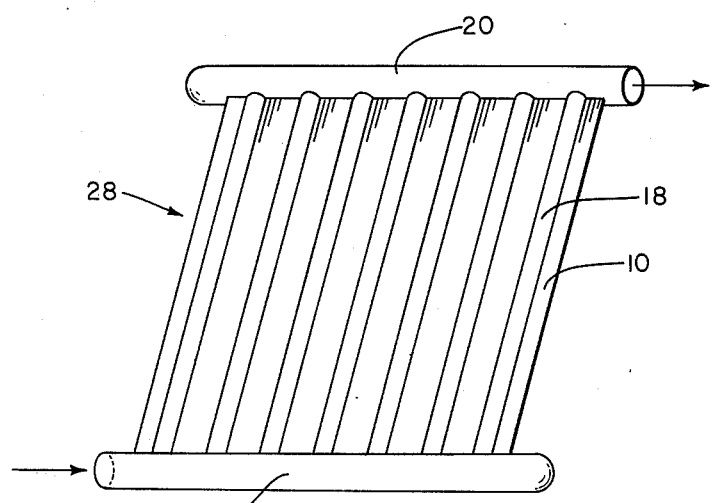
FIG. 6 is a perspective view of the product according to the method of the invention.

The soft annealed copper sheet allows creep forming to occur at lower pressures and temperatures than would be required with a full hard copper sheet. Since sheet 10 is soft, and not self-supporting, conduits 18 are selected to provide strength for the heating unit 28 (FIG. 6). Preferably, as noted above, conduits 18 are hard drawn copper tubing. If soft tubing were used, it too would be deformed during the creep forming step.

EXAMPLE

A heating unit (FIG. 6) manufactured according to the invention can be advantageously connected and used for heating fluids under high pressures, such as for example, a hot water heater. In a typical assembly process, a thin, fully annealed, copper sheet, typically 0.0027 inches thick (and hence weighing about two ounces per square foot) is laid on top of a contoured or grooved cast aluminum plate having a thickness of about ¾ inch. The plate may be contoured or grooved according to any of a number of procedures; however in this example the plate is contoured using a milling machine.

The tubular conduits 18 and headers 20 are assembled together most conveniently in a fixture similar in shape to plate 10. The conduits 18 may be ⅜ inch O.D., 0.014 inch wall thickness or less, hard drawn copper spaced on two inch centers. The headers 20 may be ¾ inch TYPE M copper tubing.

The headers are cut to the appropriate length and drill holes preferably 0.003-0.005 inches larger than the outside diameter of conduits 18 are drilled. In this example, the holes are on 2 inch centers. The conduits are assembled with the headers and a B Cu P2 paste brazing alloy is applied to the conduit-header joints. The assembly is placed in a gas manifold to melt and flow the braze into the joints.

A higher temperature 5 Sn-95 Pb paste solder is then dispensed on the center line of each conduit. The frame assembly is placed on top of the annealed sheet with the necessary fixtures to align the conduits and the grooves. A light clamping pressure is applied to maintain the assembly in an aligned configuration and to ensure good thermal contact between the plate, the sheet and the paste solder. The plate is then heated electrically to the solder melting temperature, 600° F. When the temperature has risen to about 500° F the clamping pressure is increased to about 5 to 30 psi to creep form the sheet in about four minutes.

A full or partially annealed sheet is used because it allows creep forming at a lower temperature and pressure than would be required with a full drawn copper sheet.

Other embodiments of the invention will be obvious to those skilled in the art and are within the following claims.

We claim:
1. A process of fabricating a solar heating unit for heating fluids comprising the steps of
   a. placing a thin, soft, annealed sheet having a good thermal conductivity characteristic in an abutting relation to a grooved surface of a self-supporting, thermally conductive planar plate, the sheet being between one-eight hard and fully annealed,
   b. assembling a plurality of cylindrical elongated hard drawn tubular elements in a spaced apart planar relation, the spacing between said elements equal to the spacing between said grooves, and the contour of said grooves substantially conforming to an attachment portion of the contour of said cylindrical elements, c. connecting headers in a fluid-tight connection to the assembled elements to provide fluid flow paths between said headers and through said elements, d. applying a thermally conductive paste adhesive along said attachment portion of the elements, e. positioning said assembled elements in an aligned relation to the grooves in said plate with said attachment portion abutting said thin sheet, and f. pressing said elements against said sheet with sufficient pressure and temperature to creep form said sheet around said attachment portion of said elements, and to simultaneously melt said paste adhesive to thereby provide a good thermally conductive metallurgical bond between the elements and the sheet.

2. The process of claim 1 wherein said pressing step comprises the steps of first heating said sheet to a temperature wherein said paste adhesive begins to melt and thereafter, applying sufficient pressure against said elements to effect creep forming while maintaining said temperature substantially constant.

3. The process of claim 2 wherein said heating step includes the step of applying heat to said planar plate to thereby heat said sheet and melt the paste adhesive.

4. The process of claim 2 wherein said creep forming step is performed at temperatures in the range of about 600° to 700° F.

5. The process of claim 4 wherein said paste adhesive is a solder containing at least 90% lead.

6. The process of claim 2 wherein said thin sheet is copper and said sheet is fully annealed.

7. The process of claim 2 wherein said sheet is in thermal contact with substantially one-third of the surface contact area of said elements.

8. A process of fabricating a solar heating unit for heating fluids comprising the steps of a. placing a thin, soft annealed sheet of copper in an abutting relation to a grooved, self-supporting, thermally conductive planar plate, the sheet being substantially fully annealed, b. assembling a plurality of circular cross section elongated tubular elements in a spaced apart planar relation, the spacing between elements equal to the spacing between said grooves and the contour of said grooves conforming to an attachment portion of the contour of said cylindrical elements, c. connecting headers in a fluid-tight connection to the assembled elements to provide fluid flow paths between said headers and through the elements, d. applying a thermally conductive paste solder to an attachment portion of said elements, e. positioning said assembled elements in an aligned relation with the grooved plate and with said attachment portion abutting said thin copper sheet, and f. heating said sheets to between 600° and 700° F to melt said paste solder and simultaneously applying a pressure force to slowly urge said elements against said sheet to creep form said sheet around substantially one-third of the surface contour of said elements, thereby to provide a good large surface, thermally conductive, metallurgical bond between the elements and the sheet.

* * * * *